(12) United States Patent
Bhide et al.

(10) Patent No.: US 11,657,323 B2
(45) Date of Patent: May 23, 2023

(54) MACHINE LEARNING MODEL ACCURACY FAIRNESS

(71) Applicant: INTERNATIONAL BUSINESS MACHINES CORPORATION, Armonk, NY (US)

(72) Inventors: Manish Anand Bhide, Hyderabad (IN); Madhavi Katari, Kondapur (IN); Ravi Chandra Chamarthy, Hyderabad (IN); Swapna Somineni, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 16/814,603

(22) Filed: Mar. 10, 2020

(65) Prior Publication Data

US 2021/0287131 A1     Sep. 16, 2021

(51) Int. Cl.
   *G06F 3/00*     (2006.01)
   *G06N 20/00*     (2019.01)
   *G06N 5/04*     (2023.01)
   *G06F 3/01*     (2006.01)

(52) U.S. Cl.
   CPC ............... *G06N 20/00* (2019.01); *G06N 5/04* (2013.01)

(58) Field of Classification Search
   None
   See application file for complete search history.

(56) References Cited

U.S. PATENT DOCUMENTS

| | | | |
|---|---|---|---|
| 10,228,615 B2 | 5/2019 | Baker et al. | |
| 2016/0237506 A1 | 8/2016 | Pritzker et al. | |
| 2019/0205782 A1 | 7/2019 | Benton et al. | |
| 2020/0117990 A1* | 4/2020 | Rhu | G06F 15/17375 |
| 2020/0302340 A1* | 9/2020 | Durand | G06N 20/00 |
| 2020/0311601 A1* | 10/2020 | Robinson | G06N 20/00 |
| 2020/0382361 A1* | 12/2020 | Chandrasekhar | H04L 41/064 |
| 2020/0387817 A1* | 12/2020 | Kurtz | G06T 7/20 |
| 2021/0080269 A1* | 3/2021 | Sharma | G06Q 50/30 |
| 2021/0110313 A1* | 4/2021 | Jones | G06K 9/6284 |
| 2022/0058211 A1* | 2/2022 | Wismüller | G06F 16/2264 |
| 2022/0092346 A1* | 3/2022 | Jones | G06V 10/751 |
| 2022/0227379 A1* | 7/2022 | Robinson | B60W 50/04 |
| 2022/0277232 A1* | 9/2022 | Jones | G06N 20/20 |

FOREIGN PATENT DOCUMENTS

WO     2019205544 A1     10/2019

\* cited by examiner

*Primary Examiner* — Toan H Vu

(74) *Attorney, Agent, or Firm* — Conley Rose, P.C.

(57) ABSTRACT

A system includes a memory having instructions therein and at least one processor in communication with the memory. The at least one processor is configured to execute the instructions to run a machine learning base model on input data to generate base model prediction data and run a machine learning error prediction model on the input data to generate error prediction data. The at least one processor is configured to execute the instructions to generate predicted correct base model prediction data based on the base model prediction data and the error prediction data. The at least one processor is configured to execute the instructions to generate confusion values data based on the base model prediction data and the predicted correct base model prediction data. The at least one processor is also configured to execute the instructions to generate base model accuracy fairness metrics data based on the confusion values data.

25 Claims, 5 Drawing Sheets

MACHINE LEARNING MODEL ACCURACY FAIRNESS

BACKGROUND

The present disclosure relates generally to the field of artificial intelligence and, more particularly, to improving the accuracy fairness of a machine learning model.

Various abilities of machines to acquire and apply knowledge and skills have been categorized as artificial intelligence ("AI"). Machine learning has been considered to be a form of AI. Machine learning has employed algorithms and statistical models that have enabled computer systems to perform tasks based primarily on data patterns and associated inferences rather than explicit instructions. Some machine learning models have been used to predict future conditions or performances of different persons under various circumstances. Accounting for the relative inaccuracies of such predictions for one category or group of persons as opposed to another has been challenging.

SUMMARY

A method for generating a machine learning error prediction model is disclosed. The method includes receiving a machine learning model, the machine learning model having been trained on machine learning model training data comprising ground truth data. The method also includes receiving the machine learning model training data. The method also includes running the machine learning model on the machine learning model training data to generate prediction data. The method also includes comparing the prediction data to the ground truth data to generate error data. The method also includes generating the machine learning error prediction model based on the error data.

A method for correcting machine learning model prediction data is also disclosed. The method includes receiving a machine learning base model. The method also includes receiving input data. The method also includes running the machine learning base model on the input data to generate base model prediction data. The method also includes running a machine learning error prediction model on the input data to generate error prediction data corresponding to a prediction by the machine learning error prediction model as to whether presently nonexistent ground truth data will ultimately show the base model prediction data to be true. The method also includes generating predicted correct base model prediction data based on the base model prediction data and the error prediction data.

A method for generating machine learning model fairness accuracy metrics is also disclosed. The method includes running a machine learning base model on first input data to generate first base model prediction data. The method also includes running a machine learning error prediction model on the first input data to generate first error prediction data. The method also includes generating first predicted correct base model prediction data based on the first base model prediction data and the first error prediction data. The method also includes generating first confusion values data based on the first base model prediction data and the first predicted correct base model prediction data. The method also includes generating base model accuracy fairness metrics data based on the first confusion values data.

A system for generating machine learning model fairness accuracy metrics is also disclosed. The system includes a memory having instructions therein and at least one processor in communication with the memory. The at least one processor is configured to execute the instructions to run a machine learning base model on first input data to generate first base model prediction data. The at least one processor is also configured to execute the instructions to run a machine learning error prediction model on the first input data to generate first error prediction data. The at least one processor is also configured to execute the instructions to generate first predicted correct base model prediction data based on the first base model prediction data and the first error prediction data. The at least one processor is also configured to execute the instructions to generate first confusion values data based on the first base model prediction data and the first predicted correct base model prediction data. The at least one processor is also configured to execute the instructions to generate base model accuracy fairness metrics data based on the first confusion values data.

A computer program product for generating machine learning model fairness accuracy metrics is also disclosed. The computer program product includes a computer readable storage medium having program instructions embodied therewith. The program instructions are executable by at least one processor to cause the at least one processor to run a machine learning base model on first input data to generate first base model prediction data. The program instructions are also executable by the at least one processor to cause the at least one processor to run a machine learning error prediction model on the first input data to generate first error prediction data. The program instructions are also executable by the at least one processor to cause the at least one processor to generate first predicted correct base model prediction data based on the first base model prediction data and the first error prediction data. The program instructions are also executable by the at least one processor to cause the at least one processor to generate first confusion values data based on the first base model prediction data and the first predicted correct base model prediction data. The program instructions are also executable by the at least one processor to cause the at least one processor to generate base model accuracy fairness metrics data based on the first confusion values data.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
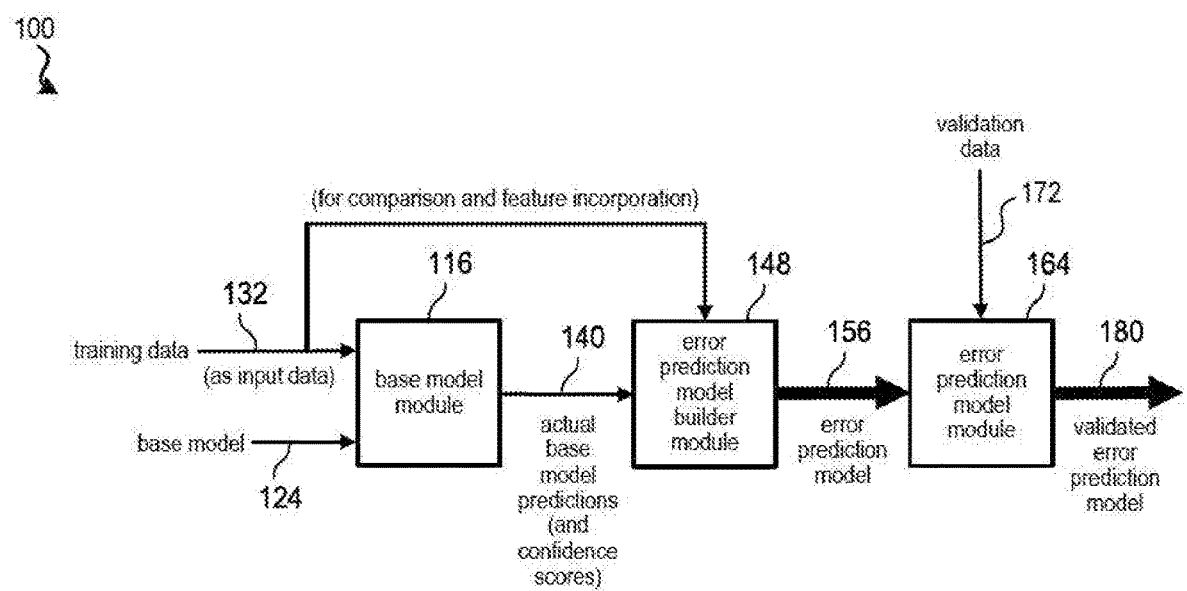
FIG. 1 is a block diagram illustration of a machine learning model error prediction model generation system in accordance with aspects of the present disclosure.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Average odds difference, error rate difference, false positive rate difference, and other metrics may be used to determine extents to which a machine learning model's predictions of future conditions or performances of different persons are fair to a minority or underrepresented group (e.g., female, racial minority, etc.) relative to a majority or privileged group. One of the challenges in computing such metrics has been that they have conventionally required ground truth data, which in many instances has not been readily available. For example, in the case of a machine learning model that is used to decide whether a loan should or should not be made to a particular person (by predicting whether the person will repay the loan or, conversely, will default), the true outcome might not be known until several years after the loan is made, or will never be known if the loan is denied. Aspects of the present disclosure provide tools for generating various equality of opportunity fairness metrics for a machine learning model without having access to much of the ground truth data that conventionally would be needed for such computations. As used herein, the terms "machine learning base model" and "base model" (and inflections thereof) mean a machine learning model for which one or more such metrics and/or one or more predicted correct predictions may be determined.

As used within the written disclosure and in the claims, the terms "including" and "comprising" (and inflections thereof) are used in an open-ended fashion, and thus should be interpreted to mean "including, but not limited to." Unless otherwise indicated, as used throughout this document, "or" does not require mutual exclusivity, and the singular forms "a," "an," and "the" are intended to include the plural forms as well, unless the context clearly indicates otherwise.

A "module" or "unit" (and inflections thereof) as referenced herein comprises one or more hardware or electrical components such as electrical circuitry, processors, and memory that may be specially configured to perform a particular function. The memory may comprise volatile memory or non-volatile memory that stores data such as, but not limited to, computer executable instructions, machine code, and other various forms of data. The module or unit may be configured to use the data to execute one or more instructions to perform one or more tasks. In certain instances, a module or unit may also refer to a particular set of functions, software instructions, or circuitry that is configured to perform a specific task. For example, a module or unit may comprise software components such as, but not limited to, data access objects, service components, user interface components, application programming interface ("API") components; hardware components such as electrical circuitry, processors, and memory; and/or a combination thereof. As referenced herein, computer executable instructions may be in any form including, but not limited to, machine code, assembly code, and high-level programming code written in any programming language.

Also, as used herein, the term "communicate" (and inflections thereof) means to receive and/or transmit data or information over a communication link. The communication link may include both wired and wireless links, and may comprise a direct link or may comprise multiple links passing through one or more communication networks or network devices such as, but not limited to, routers, firewalls, servers, and switches. The communication networks may comprise any type of wired or wireless network. The networks may include private networks and/or public networks such as the Internet. Additionally, in some embodiments, the term communicate may also encompass internal communication between various components of a system and/or with an external input/output device such as a keyboard or display device.

FIG. 1 is a block diagram illustration of a machine learning model error prediction model generation ("MLMEPMG") system 100 in accordance with aspects of the present disclosure. The MLMEPMG system 100 is configured to implement a machine learning model error prediction model generation ("MLMEPMG") process 300 in accordance with aspects of the present disclosure (the MLMEPMG process 300 per se is not explicitly illustrated in FIG. 1, but see FIG. 3). The MLMEPMG system 100 comprises a first base model module 116. The first base model module 116 is configured to receive communication of, store, and run a machine learning base model 124 that has been trained on machine learning model training data 132. The first base model module 116 is also configured to receive communication of the machine learning model training data 132. It should be appreciated that the machine learning model training data 132 may comprise ground truth data that has been manually labeled by a system developer or otherwise suitably predesignated. The first base model module 116 is also configured to use the machine learning model training data 132 as input data for running the machine learning base model 124 to generate first actual base model predictions (and associated confidence scores) data 140. It should be appreciated that the confidence scores data will correspond to probabilities (as determined by the machine learning base model 124) that the predictions made by the machine learning base model 124 will be true. In some embodiments, the first base model module 116 may comprise a corresponding one or more of a data processing system like the data processing system 600 (the data processing system 600 per se is not explicitly illustrated in FIG. 1, but see FIG. 6).

The MLMEPMG system 100 also comprises an error prediction model builder module 148. The error prediction model builder module 148 is communicatively coupled to the first base model module 116. The error prediction model builder module 148 is configured to generate a machine learning error prediction model 156 for predicting whether predictions of the machine learning base model 124 will ultimately become true. More particularly, the error prediction model builder module 148 is configured to receive communication of the machine learning model training data 132, is configured to receive communication of the first actual base model predictions (and associated confidence scores) data 140, and is configured to generate the machine learning error prediction model 156 based on the machine learning model training data 132 and the first actual base model predictions (and associated confidence scores) data 140. Even more particularly, the error prediction model builder module 148 is configured to generate the machine learning error prediction model 156 such that four things occur.

First, the machine learning error prediction model 156 comprises all of the feature data columns of the machine learning model training data 132.

Second, the machine learning error prediction model 156 further comprises a first additional feature data column comprising the confidence scores from the first actual base model predictions (and associated confidence scores) data 140.

Third, the machine learning error prediction model 156 further comprises a second additional feature data column comprising, for each record of the first actual base model predictions (and associated confidence scores) data 140, the arithmetic difference between the confidence scores for the top two most significant (as predesignated by a system developer) classes.

Fourth, the machine learning error prediction model 156 further comprises an additional "actual error" feature data column, where each "actual error" record of the "actual error" feature data column conforms to the following logic.

If, for the respective record of the machine learning model training data 132, the respective record of the actual base model predictions (and associated confidence scores) data 140 corresponds to a "favorable" (or "positive" or "YES") prediction classification (by the machine learning base model 124), and the predesignated ground truth classification of the respective record of the machine learning model training data 132 corresponds to a "favorable" (or "positive" or "YES") prediction classification, then the "actual error" is "false" (or "NO" or If, for the respective record of the machine learning model training data 132, the respective record of the actual base model predictions (and associated confidence scores) data 140 corresponds to an "unfavorable" (or "negative" or "NO") prediction classification (by the machine learning base model 124), and the predesignated ground truth classification of the respective record of the machine learning model training data 132 corresponds to an "unfavorable" (or "negative" or "NO") prediction classification, then the "actual error" is "false" (or "NO" or "0").

If, for the respective record of the machine learning model training data 132, the respective record of the actual base model predictions (and associated confidence scores) data 140 corresponds to a "favorable" (or "positive" or "YES") prediction classification (by the machine learning base model 124), and the predesignated ground truth classification of the respective record of the machine learning model training data 132 corresponds to an "unfavorable" (or "negative" or "NO") prediction classification, then the "actual error" is "true" (or "YES" or "1").

Figure 6:
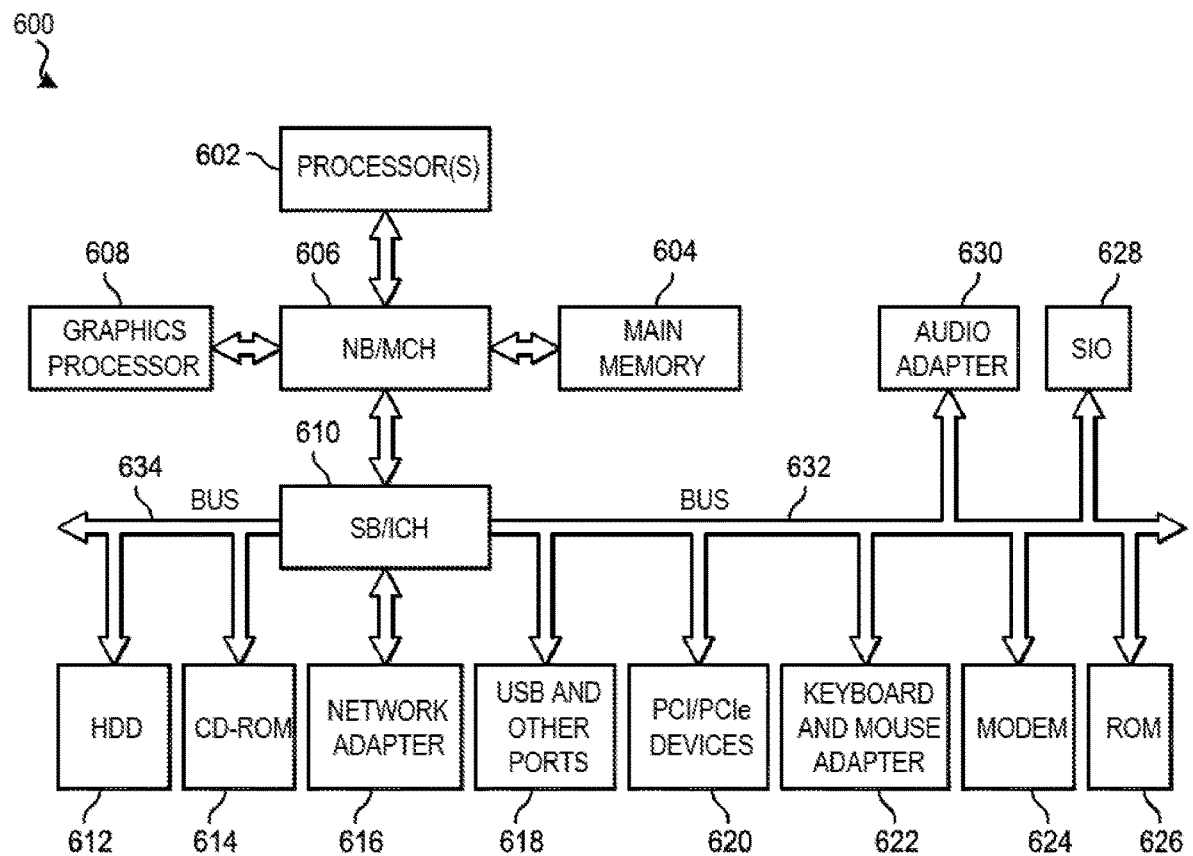
FIG. 6 is a block diagram illustration of a hardware architecture of a data processing system in accordance with aspects of the present disclosure.

If, for the respective record of the machine learning model training data 132, the respective record of the actual base model predictions (and associated confidence scores) data 140 corresponds to an "unfavorable" (or "negative" or "NO") prediction classification (by the machine learning base model 124), and the predesignated ground truth classification of the respective record of the machine learning model training data 132 corresponds to a "favorable" (or "positive" or "YES") prediction classification, then the "actual error" is "true" (or "YES" or In some embodiments, the error prediction model builder module 148 may comprise a corresponding one or more of a data processing system like the data processing system 600 (the data processing system 600 per se is not explicitly illustrated in FIG. 1, but see FIG. 6).

The MLMEPMG system 100 also comprises a first error prediction model module 164. The first error prediction model module 164 is communicatively coupled to the error prediction model builder module 148. The first error prediction model module 164 is configured to receive communication of and store the machine learning error prediction model 156. The first error prediction model module 164 is also configured to run the machine learning error prediction model 156 on validation data 172 for generating a corresponding validated machine learning error prediction model 180. The first error prediction model module 164 is also configured to store and communicate the validated machine learning error prediction model 180. In some embodiments, the first error prediction model module 164 may comprise a corresponding one or more of a data processing system like the data processing system 600 (the data processing system 600 per se is not explicitly illustrated in FIG. 1, but see FIG. 6).

Figure 2:
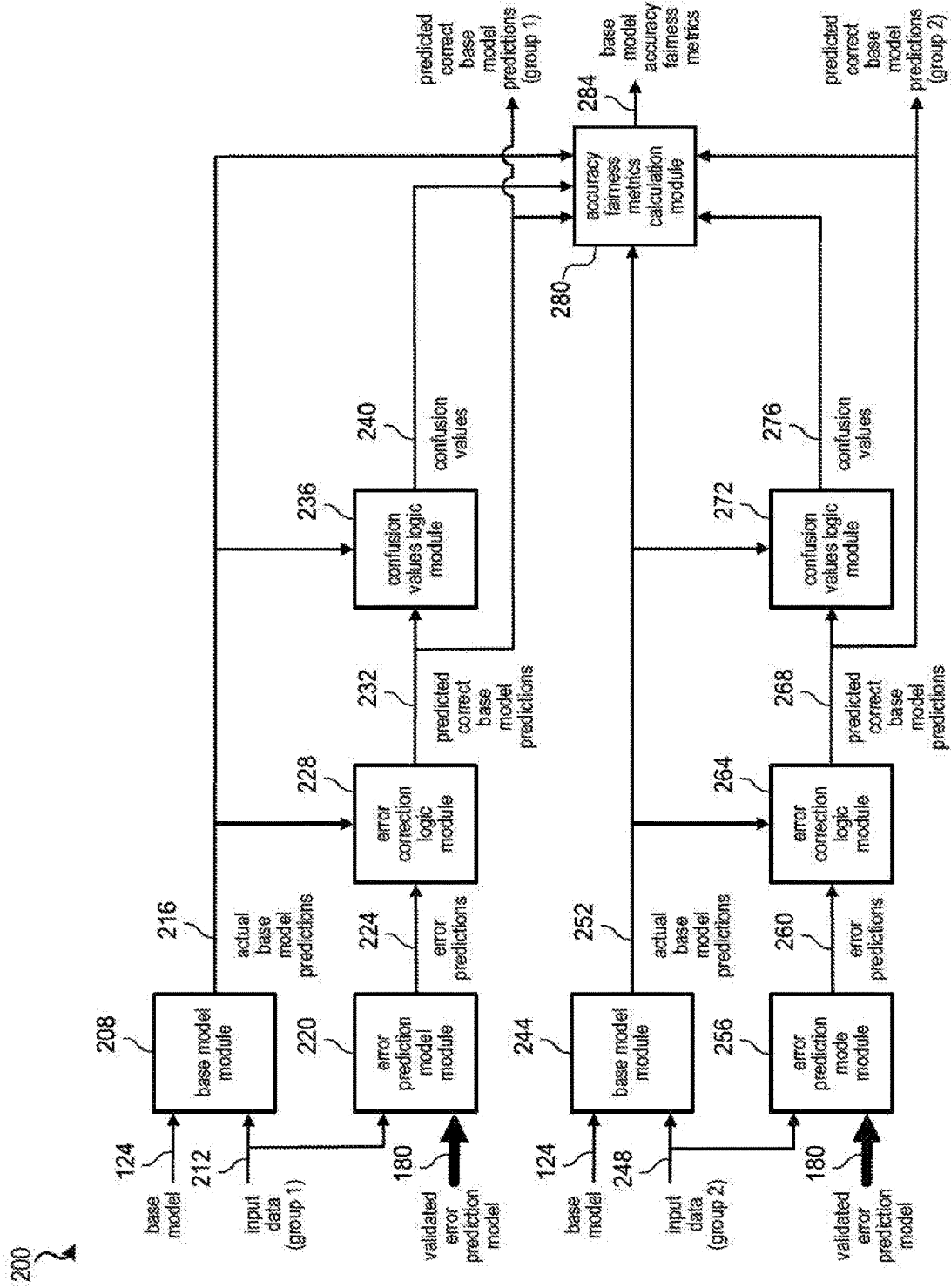
FIG. 2 is a block diagram illustration of a machine learning model prediction correction and accuracy fairness metrics generation system in accordance with aspects of the present disclosure.

FIG. 2 is a block diagram illustration of a machine learning model prediction correction and accuracy fairness metrics generation ("MLMPCAAFMG") system 200 in accordance with aspects of the present disclosure. The MLMPCAAFMG system 200 takes the validated machine learning error prediction model 180 (output by the MLMEPMG system 100) and produces predicted correct predictions and accuracy fairness metrics for the machine learning base model 124. Accordingly, the MLMPCAAFMG system 200 is configured to implement a machine learning model prediction correction ("MLMPC") process 400 and a machine learning model accuracy fairness metrics generation ("MLMAFMG") process 500 in accordance with aspects of the present disclosure (the MLMPC process 400 and the MLMAFMG process 500 per se are not explicitly illustrated in FIG. 2, but see FIG. 4 and FIG. 5, respectively). The MLMPCAAFMG system 200 comprises a second base model module 208. The second base model module 208 is configured to receive communication of, store, and run the machine learning base model 124. The second base model module 208 is also configured to receive communication of first input data 212 (corresponding to a first group of persons) for running the machine learning base model 124 to generate second actual base model predictions data 216. In some embodiments, the second base model module 208 may comprise a corresponding one or more of a data processing system like the data processing system 600 (the data processing system 600 per se is not explicitly illustrated in FIG. 2, but see FIG. 6).

The MLMPCAAFMG system 200 also comprises a second error prediction model module 220. The second error prediction model module 220 is configured to receive communication of, store, and run the validated machine learning error prediction model 180. The second error prediction model module 220 is also configured to receive communication of the first input data 212 for running the validated machine learning error prediction model 180 to generate first error predictions data 224. In some embodiments, the second error prediction model module 220 may comprise a corresponding one or more of a data processing system like the data processing system 600 (the data processing system 600 per se is not explicitly illustrated in FIG. 2, but see FIG. 6).

The MLMPCAAFMG system 200 also comprises a first error correction logic module 228. The first error correction logic module 228 is communicatively coupled to the second base model module 208 and the second error prediction model module 220. The first error correction logic module 228 is configured to receive communication of the second actual base model predictions data 216, is configured to receive communication of the first error predictions data 224, and is configured to generate first predicted correct base model predictions data 232 based on the second actual base model predictions data 216 and the first error predictions data 224. More particularly, the first error correction logic module 228 is configured to generate each record of the first predicted correct base model predictions data 232 such that four things occur.

First, if, for the respective record of the first input data 212, the respective record of the second actual base model predictions data 216 corresponds to a "favorable" (or "positive" or "YES") prediction classification (by the machine learning base model 124), and the respective record of the first error predictions data 224 corresponds to a prediction (by the validated machine learning error prediction model 180) that future (presently nonexistent) ground truth data will ultimately show the respective prediction of the machine learning base model 124 to be true, then the first error correction logic module 228 sets the respective record of the first predicted correct base model predictions data 232 to a "favorable" (or "positive" or "YES") classification.

Second, if, for the respective record of the first input data 212, the respective record of the second actual base model predictions data 216 corresponds to a "favorable" (or "positive" or "YES") prediction classification (by the machine learning base model 124), and the respective record of the first error predictions data 224 corresponds to a prediction (by the validated machine learning error prediction model 180) that future (presently nonexistent) ground truth data will ultimately show the respective prediction of the machine learning base model 124 to be false, then the first error correction logic module 228 sets the respective record of the first predicted correct base model predictions data 232 to an "unfavorable" (or "negative" or "NO") classification.

Third, if, for the respective record of the first input data 212, the respective record of the second actual base model predictions data 216 corresponds to an "unfavorable" (or "negative" or "NO") prediction classification (by the machine learning base model 124), and the respective record of the first error predictions data 224 corresponds to a prediction (by the validated machine learning error prediction model 180) that future (presently nonexistent) ground truth data will ultimately show the respective prediction of the machine learning base model 124 to be true, then the first error correction logic module 228 sets the respective record of the first predicted correct base model predictions data 232 to an "unfavorable" (or "negative" or "NO") classification.

Fourth, if, for the respective record of the first input data 212, the respective record of the second actual base model predictions data 216 corresponds to an "unfavorable" (or "negative" or "NO") prediction classification (by the machine learning base model 124), and the respective record of the first error predictions data 224 corresponds to a prediction (by the validated machine learning error prediction model 180) that future (presently nonexistent) ground truth data will ultimately show the respective prediction of the machine learning base model 124 to be false, then the first error correction logic module 228 sets the respective record of the first predicted correct base model predictions data 232 to a "favorable" (or "positive" or "YES") classification.

The first error correction logic module 228 is also configured to communicate the first predicted correct base model predictions data 232. In some embodiments, the first error correction logic module 228 may comprise a corresponding one or more of a data processing system like the data processing system 600 (the data processing system 600 per se is not explicitly illustrated in FIG. 2, but see FIG. 6).

The MLMPCAAFMG system 200 also comprises a first confusion values logic module 236. The first confusion values logic module 236 is communicatively coupled to the second base model module 208 and the first error correction logic module 228. The first confusion values logic module 236 is configured to receive communication of the second actual base model predictions data 216, is configured to receive communication of the first predicted correct base model predictions data 232, and is configured to generate first confusion values data 240 based on the second actual base model predictions data 216 and the first predicted correct base model predictions data 232. More particularly, the first confusion values logic module 236 is configured to generate each record of the first confusion values data 240 such that four things occur.

First, if, for the respective record of the first input data 212, the respective record of the second actual base model predictions data 216 corresponds to a "favorable" (or "positive" or "YES") prediction classification (by the machine learning base model 124), and the respective record of the first predicted correct base model predictions data 232 corresponds to a "favorable" (or "positive" or "YES") classification, then the first confusion values logic module 236 sets the respective record of the first confusion values data 240 to a true positive ("TP") classification.

Second, if, for the respective record of the first input data 212, the respective record of the second actual base model predictions data 216 corresponds to a "favorable" (or "positive" or "YES") prediction classification (by the machine learning base model 124), and the respective record of the first predicted correct base model predictions data 232 corresponds to an "unfavorable" (or "negative" or "NO") classification, then the first confusion values logic module 236 sets the respective record of the first confusion values data 240 to a false positive ("FP") classification.

Third, if, for the respective record of the first input data 212, the respective record of the second actual base model predictions data 216 corresponds to an "unfavorable" (or "negative" or "NO") prediction classification (by the machine learning base model 124), and the respective record of the first predicted correct base model predictions data 232 corresponds to an "unfavorable" (or "negative" or "NO") classification, then the first confusion values logic module 236 sets the respective record of the first confusion values data 240 to a true negative ("TN") classification.

Fourth, if, for the respective record of the first input data 212, the respective record of the second actual base model predictions data 216 corresponds to an "unfavorable" (or "negative" or "NO") prediction classification (by the machine learning base model 124), and the respective record of the first predicted correct base model predictions data 232 corresponds to a "favorable" (or "positive" or "YES") classification, then the first confusion values logic module 236 sets the respective record of the first confusion values data 240 to a false negative ("FN") classification.

In some embodiments, the first confusion values logic module 236 may comprise a corresponding one or more of a data processing system like the data processing system 600 (the data processing system 600 per se is not explicitly illustrated in FIG. 2, but see FIG. 6).

The MLMPCAAFMG system 200 also comprises a third base model module 244. The third base model module 244 is configured to receive communication of, store, and run the machine learning base model 124. The third base model module 244 is also configured to receive communication of second input data 248 (corresponding to a second group of persons) for running the machine learning base model 124 to generate third actual base model predictions data 252. In some embodiments, the third base model module 244 may comprise a corresponding one or more of a data processing system like the data processing system 600 (the data processing system 600 per se is not explicitly illustrated in FIG. 2, but see FIG. 6).

The MLMPCAAFMG system 200 also comprises a third error prediction model module 256. The third error prediction model module 256 is configured to receive communication of, store, and run the validated machine learning error prediction model 180. The third error prediction model module 256 is also configured to receive communication of the second input data 248 for running the validated machine learning error prediction model 180 to generate second error predictions data 260. In some embodiments, the third error prediction model module 256 may comprise a corresponding one or more of a data processing system like the data processing system 600 (the data processing system 600 per se is not explicitly illustrated in FIG. 2, but see FIG. 6).

The MLMPCAAFMG system 200 also comprises a second error correction logic module 264. The second error correction logic module 264 is communicatively coupled to the third base model module 244 and the third error prediction model module 256. The second error correction logic module 264 is configured to receive communication of the third actual base model predictions data 252, is configured to receive communication of the second error predictions data 260, and is configured to generate second predicted correct base model predictions data 268 based on the third actual base model predictions data 252 and the second error predictions data 260. More particularly, the second error correction logic module 264 is configured to generate each record of the second predicted correct base model predictions data 268 such that four things occur.

First, if, for the respective record of the second input data 248, the respective record of the third actual base model predictions data 252 corresponds to a "favorable" (or "positive" or "YES") prediction classification (by the machine learning base model 124), and the respective record of the second error predictions data 260 corresponds to a prediction (by the validated machine learning error prediction model 180) that future (presently nonexistent) ground truth data will ultimately show the respective prediction of the machine learning base model 124 to be true, then the second error correction logic module 264 sets the respective record of the second predicted correct base model predictions data 268 to a "favorable" (or "positive" or "YES") classification.

Second, if, for the respective record of the second input data 248, the respective record of the third actual base model predictions data 252 corresponds to a "favorable" (or "positive" or "YES") prediction classification (by the machine learning base model 124), and the respective record of the second error predictions data 260 corresponds to a prediction (by the validated machine learning error prediction model 180) that future (presently nonexistent) ground truth data will ultimately show the respective prediction of the machine learning base model 124 to be false, then the second error correction logic module 264 sets the respective record of the second predicted correct base model predictions data 268 to an "unfavorable" (or "negative" or "NO") classification.

Third, if, for the respective record of the second input data 248, the respective record of the third actual base model predictions data 252 corresponds to an "unfavorable" (or "negative" or "NO") prediction classification (by the machine learning base model 124), and the respective record of the second error predictions data 260 corresponds to a prediction (by the validated machine learning error prediction model 180) that future (presently nonexistent) ground truth data will ultimately show the respective prediction of the machine learning base model 124 to be true, then the second error correction logic module 264 sets the respective record of the second predicted correct base model predictions data 268 to an "unfavorable" (or "negative" or "NO") classification.

Fourth, if, for the respective record of the second input data 248, the respective record of the third actual base model predictions data 252 corresponds to an "unfavorable" (or "negative" or "NO") prediction classification (by the machine learning base model 124), and the respective record of the second error predictions data 260 corresponds to a prediction (by the validated machine learning error prediction model 180) that future (presently nonexistent) ground truth data will ultimately show the respective prediction of the machine learning base model 124 to be false, then the second error correction logic module 264 sets the respective record of the second predicted correct base model predictions data 268 to a "favorable" (or "positive" or "YES") classification.

The second error correction logic module 264 is also configured to communicate the second predicted correct base model predictions data 268. In some embodiments, the second error correction logic module 264 may comprise a corresponding one or more of a data processing system like the data processing system 600 (the data processing system 600 per se is not explicitly illustrated in FIG. 2, but see FIG. 6).

The MLMPCAAFMG system 200 also comprises a second confusion values logic module 272. The second confusion values logic module 272 is communicatively coupled to the third base model module 244 and the second error correction logic module 264. The second confusion values logic module 272 is configured to receive communication of the third actual base model predictions data 252, is configured to receive communication of the second predicted correct base model predictions data 268, and is configured to generate second confusion values data 276 based on the third actual base model predictions data 252 and the second predicted correct base model predictions data 268. More particularly, the second confusion values logic module 272 is configured to generate each record of the second confusion values data 276 such that four things occur.

First, if, for the respective record of the second input data 248, the respective record of the third actual base model predictions data 252 corresponds to a "favorable" (or "positive" or "YES") prediction classification (by the machine learning base model 124), and the respective record of the second predicted correct base model predictions data 268 corresponds to a "favorable" (or "positive" or "YES") classification, then the second confusion values logic module 272 sets the respective record of the second confusion values data 276 to a true positive ("TP") classification.

Second, if, for the respective record of the second input data 248, the respective record of the third actual base model predictions data 252 corresponds to a "favorable" (or "positive" or "YES") prediction classification (by the machine learning base model 124), and the respective record of the second predicted correct base model predictions data 268 corresponds to an "unfavorable" (or "negative" or "NO") classification, then the second confusion values logic module 272 sets the respective record of the second confusion values data 276 to a false positive ("FP") classification.

Third, if, for the respective record of the second input data 248, the respective record of the third actual base model predictions data 252 corresponds to an "unfavorable" (or "negative" or "NO") prediction classification (by the machine learning base model 124), and the respective record of the second predicted correct base model predictions data 268 corresponds to an "unfavorable" (or "negative" or "NO") classification, then the second confusion values logic module 272 sets the respective record of the second confusion values data 276 to a true negative ("TN") classification.

Fourth, if, for the respective record of the second input data 248, the respective record of the third actual base model predictions data 252 corresponds to an "unfavorable" (or "negative" or "NO") prediction classification (by the machine learning base model 124), and the respective record of the second predicted correct base model predictions data 268 corresponds to a "favorable" (or "positive" or "YES") classification, then the second confusion values logic module 272 sets the respective record of the second confusion values data 276 to a false negative ("FN") classification.

In some embodiments, the second confusion values logic module 272 may comprise a corresponding one or more of a data processing system like the data processing system 600 (the data processing system 600 per se is not explicitly illustrated in FIG. 2, but see FIG. 6).

The MLMPCAAFMG system 200 also comprises an accuracy fairness metrics calculation module 280. The accuracy fairness metrics calculation module 280 is communicatively coupled to the second base model module 208, the first error correction logic module 228, the first confusion values logic module 236, the third base model module 244, the second error correction logic module 264, and the second confusion values logic module 272. The accuracy fairness metrics calculation module 280 is configured to receive communication of the second actual base model predictions data 216, is configured to receive communication of the first predicted correct base model predictions data 232, and is configured to receive communication of the first confusion values data 240. The accuracy fairness metrics calculation module 280 is also configured to receive communication of the third actual base model predictions data 252, is configured to receive communication of the second predicted correct base model predictions data 268, and is configured to receive communication of the second confusion values data 276. The accuracy fairness metrics calculation module 280 is also configured to generate base model accuracy fairness metrics data 284 based on the second actual base model predictions data 216, the first predicted correct base model predictions data 232, the first confusion values data 240, the third actual base model predictions data 252, the second predicted correct base model predictions data 268, and the second confusion values data 276. In some embodiments, the accuracy fairness metrics calculation module 280 is configured to generate the base model accuracy fairness metrics data 284 corresponding to the following relationships (where "P," "N," "TP," "FP," "TN," and "FN" represent the total number of "favorable" (or "positive" or "YES") classifications, the total number of "unfavorable" (or "negative" or "NO") classifications, the number of true positive classifications, the number of false positive classifications, the number of true negative classifications, and the number of false negative classifications, respectively, among the second actual base model predictions data 216, the first predicted correct base model predictions data 232, the first confusion values data 240, the third actual base model predictions data 252, the second predicted correct base model predictions data 268, and the second confusion values data 276, and where the subscript "1" denotes values for a first input data group and the subscript "2" denotes values for a second input data group):

$$\text{Average Odds Difference} = \tfrac{1}{2}[(FPR_2 - FPR_1) + (TPR_1 - TPR_2))]; \qquad (1)$$

$$\text{Error Rate Difference} = ERR_2 - ERR_1, \text{ where } ERR = (FP + FN)/(P + N); \qquad (2)$$

$$\text{False Discovery Rate Difference} = FDR_2 - FDR_1, \text{ where } FDR = FP/(TP + FP); \qquad (3)$$

$$\text{False Negative Rate Difference} = FNR_2 - FNR_1, \text{ where } FNR = FN/P; \qquad (4)$$

$$\text{False Omission Rate Difference} = FOR_2 - FOR_1, \text{ where } FOR = FN/(TN + FN); \qquad (5)$$

$$\text{False Positive Rate Difference} = FPR_2 - FPR_1, \text{ where } FPR = FP/N; \text{ and} \qquad (6)$$

$$\text{True Positive Rate Difference} = TPR_2 - TPR_1, \text{ where } TPR = TP/P. \qquad (7)$$

The accuracy fairness metrics calculation module 280 is also configured to communicate the base model accuracy fairness metrics data 284. In some embodiments, accuracy fairness metrics calculation module 280 may comprise a corresponding one or more of a data processing system like the data processing system 600 (the data processing system 600 per se is not explicitly illustrated in FIG. 2, but see FIG. 6).

Figure 3:
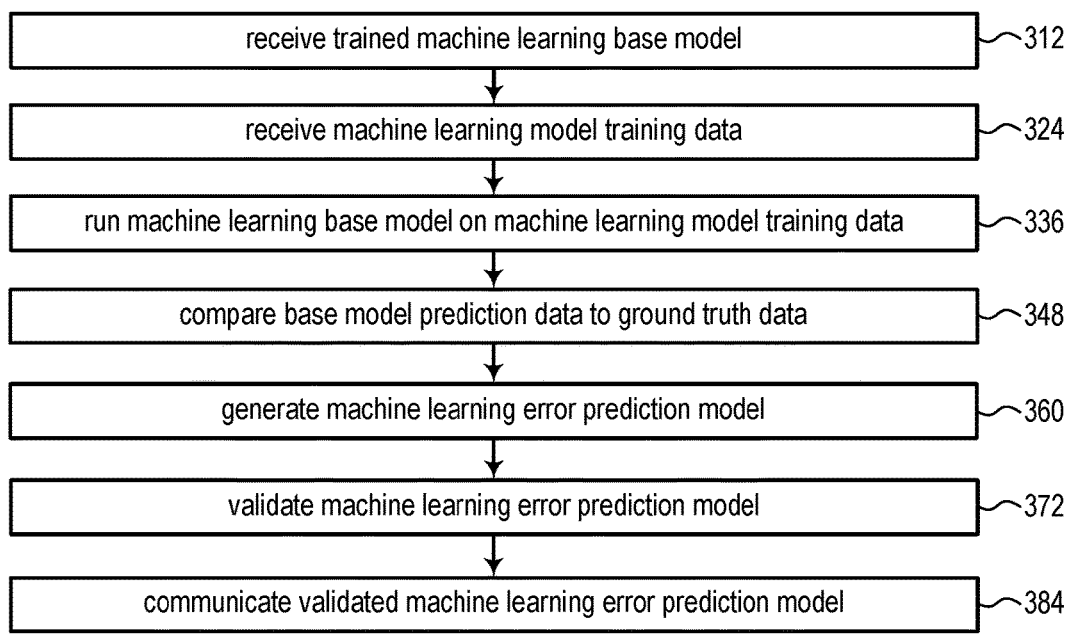
FIG. 3 is a flowchart illustration of a machine learning model error prediction model generation process in accordance with aspects of the present disclosure.

FIG. 3 is a flowchart illustration of the machine learning model error prediction model generation ("MLMEPMG") process 300. In some instances, one or more steps of the MLMEPMG process 300 may be performed by one or more components of the MLMEPMG system 100 and/or one or more of the other systems, components, methods, and/or processes described herein. For clarity of exposition, the following description(s) of the MLMEPMG process 300 may refer to one or more of such systems, components, methods, and/or processes. Nevertheless, it should be appreciated that the MLMEPMG process 300 and/or any one or more of its particular steps may be performed by any suitable system(s), component(s), method(s), and/or process(es). It should also be appreciated that the MLMEPMG process 300 may be performed concurrently or substantially concurrently with any other method(s) and/or process(es) described herein.

At step 312, the MLMEPMG process 300 receives a machine learning base model that has been trained on machine learning model training data comprising ground truth data that has been manually labeled by a system developer or otherwise suitably predesignated. Accordingly, in some instances, the first base model module 116 may receive communication of the machine learning base model 124. From step 312, the MLMEPMG process 300 goes to (and continues at) step 324.

At step 324, the MLMEPMG process 300 receives the machine learning model training data comprising the ground truth data. Accordingly, in some instances, the first base model module 116 and/or the error prediction model builder module 148 may receive communication of the machine learning model training data 132. From step 324, the MLMEPMG process 300 goes to (and continues at) step 336.

At step 336, the MLMEPMG process 300 runs the machine learning base model on the machine learning model training data to generate prediction data. Accordingly, in some instances, the first base model module 116 may run the machine learning base model 124 on the machine learning model training data 132 to generate the first actual base model predictions (and associated confidence scores) data 140. From step 336, the MLMEPMG process 300 goes to (and continues at) step 348.

At step 348, the MLMEPMG process 300 compares the prediction data to the ground truth data to generate error data. Accordingly, in some instances, the error prediction model builder module 148 may compare the actual base model predictions of the first actual base model predictions (and associated confidence scores) data 140 to the ground truth classifications of the machine learning model training data 132 to generate the "actual error" feature data column for the machine learning error prediction model 156. From step 348, the MLMEPMG process 300 goes to (and continues at) step 360.

At step 360, the MLMEPMG process 300 generates a machine learning error prediction model based on the error data. Accordingly, in some instances, the error prediction model builder module 148 may incorporate the "actual error" feature data column into the machine learning error prediction model 156. From step 360, the MLMEPMG process 300 goes to (and continues at) step 372.

At step 372, the MLMEPMG process 300 validates the machine learning error prediction model. Accordingly, in some instances, the first error prediction model module 164 may run the machine learning error prediction model 156 on the validation data 172 to validate the machine learning error prediction model 156. From step 372, the MLMEPMG process 300 goes to (and continues at) step 384.

At step 384, the MLMEPMG process 300 communicates the validated machine learning error prediction model. Accordingly, in some instances, the first error prediction model module 164 may communicate the validated machine learning error prediction model 180 to the second error prediction model module 220 and/or the third error prediction model module 256. It should be appreciated that in some embodiments the MLMEPMG process 300 may communicate the validated machine learning error prediction model to a user device (not explicitly illustrated) as a deliverable for a user. Accordingly, in some instances, the first error prediction model module 164 may communicate the validated machine learning error prediction model 180 to such a user device.

Figure 4:
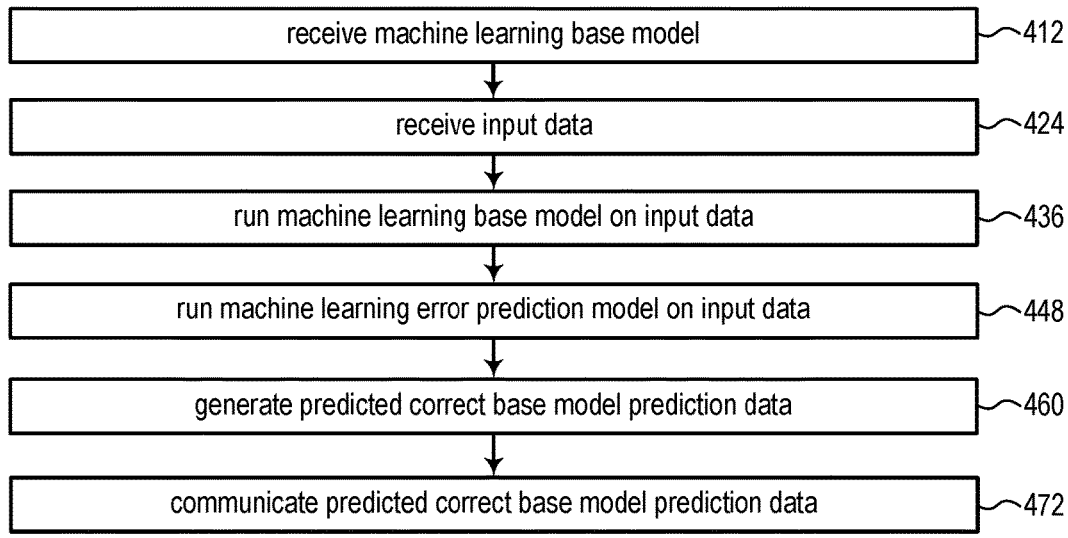
FIG. 4 is a flowchart illustration of a machine learning model prediction correction process in accordance with aspects of the present disclosure.

FIG. 4 is a flowchart illustration of the machine learning model prediction correction ("MLMPC") process 400. In some instances, one or more steps of the MLMPC process 400 may be performed by one or more components of the MLMPCAAFMG system 200 and/or one or more of the other systems, components, methods, and/or processes described herein. For clarity of exposition, the following description(s) of MLMPC process 400 may refer to one or more of such systems, components, methods, and/or processes. Nevertheless, it should be appreciated that the MLMPC process 400 and/or any one or more of its particular steps may be performed by any suitable system(s), component(s), method(s), and/or process(es). It should also be appreciated that the MLMPC process 400 may be performed concurrently or substantially concurrently with any other method(s) and/or process(es) described herein.

At step 412, the MLMPC process 400 receives a machine learning base model. Accordingly, in some instances, the second base model module 208 and/or the third base model module 244 may receive communication of the machine learning base model 124. From step 412, the MLMPC process 400 goes to (and continues at) step 424.

At step 424, the MLMPC process 400 receives input data. Accordingly, in some instances, the second base model module 208 and/or the second error prediction model module 220 may receive communication of the first input data 212, and/or the third base model module 244 and/or the third error prediction model module 256 may receive communication of the second input data 248. From step 424, the MLMPC process 400 goes to (and continues at) step 436.

At step 436, the MLMPC process 400 runs the machine learning base model on the input data to generate base model prediction data. Accordingly, in some instances, the second base model module 208 may run the machine learning base model 124 on the first input data 212 to generate the second actual base model predictions data 216, and/or the third base model module 244 may run the machine learning base model 124 on the second input data 248 to generate the third actual base model predictions data 252. From step 436, the MLMPC process 400 goes to (and continues at) step 448.

At step 448, the MLMPC process 400 runs a machine learning error prediction model on the input data to generate error prediction data corresponding to a prediction by the machine learning error prediction model as to whether presently nonexistent ground truth data will ultimately show the base model prediction data to be true. Accordingly, in some instances, the second error prediction model module 220 may run the validated machine learning error prediction model 180 on the first input data 212 to generate the first error predictions data 224, and/or the third error prediction model module 256 may run the validated machine learning error prediction model 180 on the second input data 248 to generate the second error predictions data 260. From step 448, the MLMPC process 400 goes to (and continues at) step 460.

At step 460, the MLMPC process 400 generates predicted correct base model prediction data based on the base model prediction data and the error prediction data. Accordingly, in some instances, the first error correction logic module 228 may generate the first predicted correct base model predictions data 232 based on the second actual base model predictions data 216 and the first error predictions data 224, and/or the second error correction logic module 264 may generate the second predicted correct base model predictions data 268 based on the third actual base model predictions data 252 and the second error predictions data 260. From step 460, the MLMPC process 400 goes to (and continues at) step 472.

At step 472, the MLMPC process 400 communicates the predicted correct base model prediction data. Accordingly, in some instances, the first error correction logic module 228 may communicate the first predicted correct base model predictions data 232 and/or the second error correction logic module 264 may communicate the second predicted correct base model predictions data 268. It should be appreciated that in some embodiments the MLMPC process 400 may communicate the predicted correct base model prediction data to a user device (not explicitly illustrated) as a deliverable for a user. Accordingly, in some instances, the first error correction logic module 228 may communicate the first predicted correct base model predictions data 232 to such a user device, and/or the second error correction logic module 264 may communicate the second predicted correct base model predictions data 268 to such a user device.

Figure 5:
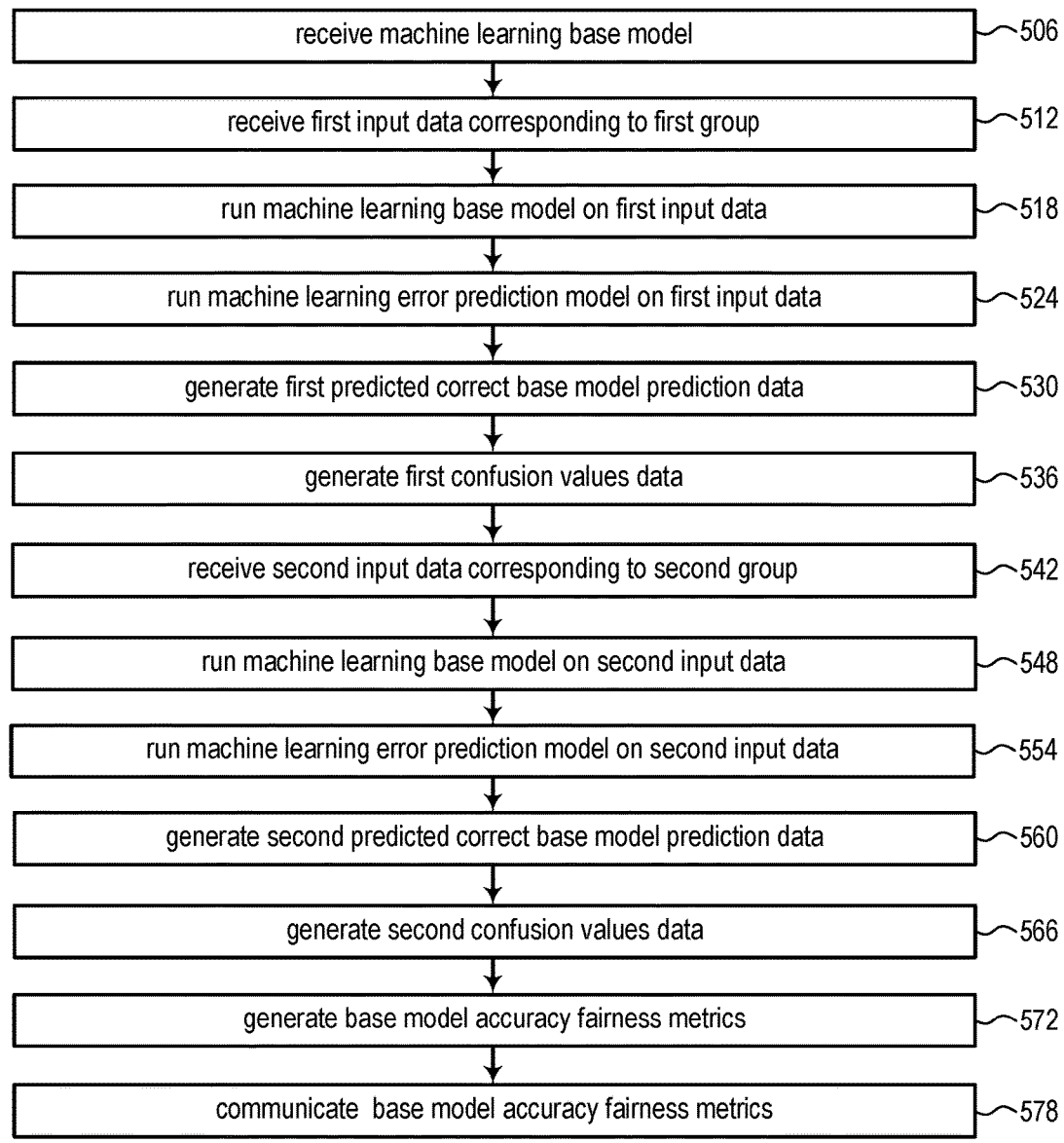
FIG. 5 is a flowchart illustration of a machine learning model accuracy fairness metrics generation process in accordance with aspects of the present disclosure.

FIG. 5 is a flowchart illustration of the machine learning model accuracy fairness metrics generation ("MLMA- FMG") process 500. In some instances, one or more steps of the MLMAFMG process 500 may be performed by one or more components of the MLMPCAAFMG system 200 and/or one or more of the other systems, components, methods, and/or processes described herein. For clarity of exposition, the following description(s) of MLMAFMG process 500 may refer to one or more of such systems, components, methods, and/or processes. Nevertheless, it should be appreciated that the MLMAFMG process 500 and/or any one or more of its particular steps may be performed by any suitable system(s), component(s), method(s), and/or process(es). It should also be appreciated that the MLMAFMG process 500 may be performed concurrently or substantially concurrently with any other method(s) and/or process(es) described herein.

At step 506, the MLMAFMG process 500 receives a machine learning base model. Accordingly, in some instances, the second base model module 208 and/or the third base model module 244 may receive communication of the machine learning base model 124. From step 506, the MLMAFMG process 500 goes to (and continues at) step 512.

At step 512, the MLMAFMG process 500 receives first input data corresponding to a first group of persons. Accordingly, in some instances, the second base model module 208 and/or the second error prediction model module 220 may receive communication of the first input data 212. From step 512, the MLMAFMG process 500 goes to (and continues at) step 518.

At step 518, the MLMAFMG process 500 runs the machine learning base model on the first input data to generate first base model prediction data. Accordingly, in some instances, the second base model module 208 may run the machine learning base model 124 on the first input data 212 to generate the second actual base model predictions data 216. From step 518, the MLMAFMG process 500 goes to (and continues at) step 524.

At step 524, the MLMAFMG process 500 runs a machine learning error prediction model on the first input data to generate first error prediction data. Accordingly, in some instances, the second error prediction model module 220 may run the validated machine learning error prediction model 180 on the first input data 212 to generate the first error predictions data 224. From step 524, the MLMAFMG process 500 goes to (and continues at) step 530.

At step 530, the MLMAFMG process 500 generates first predicted correct base model prediction data based on the first base model prediction data and the first error prediction data. Accordingly, in some instances, the first error correction logic module 228 may generate the first predicted correct base model predictions data 232 based on the second actual base model predictions data 216 and the first error predictions data 224. From step 530, the MLMAFMG process 500 goes to (and continues at) step 536.

At step 536, the MLMAFMG process 500 generates first confusion values data based on the first base model prediction data and the first predicted correct base model prediction data. Accordingly, in some instances, the first confusion values logic module 236 may generate the first confusion values data 240 based on the second actual base model predictions data 216 and the first predicted correct base model predictions data 232. From step 536, the MLMAFMG process 500 goes to (and continues at) step 542.

At step 542, the MLMAFMG process 500 receives second input data corresponding to a second group of persons. Accordingly, in some instances, the third base model module 244 and/or the third error prediction model module 256 may receive communication of the second input data 248. From step 542, the MLMAFMG process 500 goes to (and continues at) step 548.

At step 548, the MLMAFMG process 500 runs the machine learning base model on the second input data to generate second base model prediction data. Accordingly, in some instances, the third base model module 244 may run the machine learning base model 124 on the second input data 248 to generate the third actual base model predictions data 252. From step 548, the MLMAFMG process 500 goes to (and continues at) step 554.

At step 554, the MLMAFMG process 500 runs a machine learning error prediction model on the second input data to generate second error prediction data. Accordingly, in some instances, the third error prediction model module 256 may run the validated machine learning error prediction model 180 on the second input data 248 to generate the second error predictions data 260. From step 554, the MLMAFMG process 500 goes to (and continues at) step 560.

At step 560, the MLMAFMG process 500 generates second predicted correct base model prediction data based on the second base model prediction data and the second error prediction data. Accordingly, in some instances, the second error correction logic module 264 may generate the second predicted correct base model predictions data 268 based on the third actual base model predictions data 252 and the second error predictions data 260. From step 560, the MLMAFMG process 500 goes to (and continues at) step 566.

At step 566, the MLMAFMG process 500 generates second confusion values data based on the second base model prediction data and the second predicted correct base model prediction data. Accordingly, in some instances, the second confusion values logic module 272 may generate the second confusion values data 276 based on the third actual base model predictions data 252 and the second predicted correct base model predictions data 268. From step 566, the MLMAFMG process 500 goes to (and continues at) step 572.

At step 572, the MLMAFMG process 500 generates base model accuracy fairness metrics data based on the first confusion values data and the second confusion values data. Accordingly, in some instances, the accuracy fairness metrics calculation module 280 may generate base model accuracy fairness metrics data 284 based on the second actual base model predictions data 216, the first predicted correct base model predictions data 232, the first confusion values data 240, the third actual base model predictions data 252, the second predicted correct base model predictions data 268, and the second confusion values data 276. From step 572, the MLMAFMG process 500 goes to (and continues at) step 578.

At step 578, the MLMAFMG process 500 communicates the base model accuracy fairness metrics data. Accordingly, in some instances, the accuracy fairness metrics calculation module 280 may communicate the base model accuracy fairness metrics data 284. It should be appreciated that in some embodiments the MLMAFMG process 500 may communicate the base model accuracy fairness metrics data to a user device (not explicitly illustrated) as a deliverable for a user. Accordingly, in some instances, the accuracy fairness metrics calculation module 280 may communicate the base model accuracy fairness metrics data 284 to such a user device.

FIG. 6 is a block diagram illustration of a hardware architecture of a data processing system 600 in accordance with aspects of the present disclosure. In some embodiments, one or more of the systems and/or components described herein (e.g., the MLMEPMG system 100, the MLMPCAAFMG system 200, etc.) may be implemented using a corresponding one or more of the data processing system 600. Moreover, the data processing system 600 may be configured to store and execute one or more instructions for performing on ore more steps of the MLMEPMG process 300, for performing one or more steps of the MLMPC process 400, for performing one or more steps of the MLMAFMG process 500, and/or for performing one or more steps of any other methods and/or processes described herein.

The data processing system 600 employs a hub architecture including north bridge and memory controller hub ("NB/MCH") 606 and south bridge and input/output ("I/O") controller hub ("SB/ICH") 610. Processor(s) 602, main memory 604, and graphics processor 608 are connected to NB/MCH 606. Graphics processor 608 may be connected to NB/MCH 606 through an accelerated graphics port ("AGP"). A computer bus, such as bus 632 or bus 634, may be implemented using any type of communication fabric or architecture that provides for a transfer of data between different components or devices attached to the fabric or architecture.

Network adapter 616 connects to SB/ICH 610. Audio adapter 630, keyboard and mouse adapter 622, modem 624, read-only memory ("ROM") 626, hard disk drive ("HDD") 612, compact disk read-only memory ("CD-ROM") drive 614, universal serial bus ("USB") ports and other communication ports 618, and peripheral component interconnect/peripheral component interconnect express ("PCI/PCIe") devices 620 connect to SB/ICH 610 through bus 632 and bus 634. PCI/PCIe devices may include, for example, Ethernet adapters, add-in cards, and personal computing ("PC") cards for notebook computers. PCI uses a card bus controller, while PCIe does not. ROM 626 may comprise, for example, a flash basic input/output system ("BIOS"). Modem 624 or network adapter 616 may be used to transmit and receive data over a network.

HDD 612 and CD-ROM drive 614 connect to SB/ICH 610 through bus 634. HDD 612 and CD-ROM drive 614 may use, for example, an integrated drive electronics ("IDE") or serial advanced technology attachment ("SATA") interface. In some embodiments, the HDD 612 may be replaced by other forms of data storage devices including, but not limited to, solid-state drives ("SSDs"). A super I/O ("SIO") device 628 may be connected to SB/ICH 610. SIO device 628 may comprise a chip on the motherboard that is configured to assist in performing less demanding controller functions for the SB/ICH 610 such as controlling a printer port, controlling a fan, and/or controlling the small light emitting diodes ("LEDS") of the data processing system 600.

The data processing system 600 may include a single processor 602 or may include a plurality of processors 602. Additionally, processor(s) 602 may have multiple cores. In some embodiments, data processing system 600 may employ a large number of processors 602 that include hundreds or thousands of processor cores. In some embodiments, the processors 602 may be configured to perform a set of coordinated computations in parallel.

An operating system is executed on the data processing system 600 using the processor(s) 602. The operating system coordinates and provides control of various components within the data processing system 600. Various applications and services may run in conjunction with the operating system. Instructions for the operating system, applications, and other data are located on storage devices, such as one or more of the HDD 612, and may be loaded into main memory 604 for execution by processor(s) 602. In some embodiments, additional instructions or data may be stored on one or more external devices. The processes described herein for the illustrative embodiments may be performed by processor(s) 602 using computer usable program code, which may be located in a memory such as, for example, main memory 604, ROM 626, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In accordance with aspects of the present disclosure, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating a machine learning error prediction model, the method comprising:
   receiving a machine learning model, the machine learning model having been trained on machine learning model training data comprising ground truth data;
   receiving the machine learning model training data;
   running the machine learning model on the machine learning model training data to generate prediction data;
   comparing the prediction data to the ground truth data to generate error data; and
   generating the machine learning error prediction model based on the error data.

2. The method of claim 1, wherein generating the machine learning error prediction model based on the error data comprises incorporating the error data into the machine learning error prediction model as a feature of the machine learning error prediction model.

3. The method of claim 2, wherein generating the machine learning error prediction model comprises incorporating a plurality of features of the machine learning model training data into the machine learning error prediction model as features of the machine learning error prediction model.

4. The method of claim 3, wherein the prediction data comprises confidence data, and wherein generating the machine learning error prediction model comprises incorporating the confidence data into the machine learning error prediction model as a feature of the machine learning error prediction model.

5. A method for correcting machine learning model prediction data, the method comprising:
   receiving a machine learning base model;
   receiving input data;
   running the machine learning base model on the input data to generate base model prediction data;
   running a machine learning error prediction model on the input data to generate error prediction data corresponding to a prediction by the machine learning error prediction model as to whether presently nonexistent ground truth data will ultimately show the base model prediction data to be true; and
   generating predicted correct base model prediction data based on the base model prediction data and the error prediction data.

6. A method for generating machine learning model fairness accuracy metrics, the method comprising:

running a machine learning base model on first input data to generate first base model prediction data;

running a machine learning error prediction model on the first input data to generate first error prediction data;

generating first predicted correct base model prediction data based on the first base model prediction data and the first error prediction data;

generating first confusion values data based on the first base model prediction data and the first predicted correct base model prediction data; and generating base model accuracy fairness metrics data based on the first confusion values data.

7. The method of claim 6, further comprising:

running the machine learning base model on second input data to generate second base model prediction data;

running the machine learning error prediction model on the second input data to generate second error prediction data;

generating second predicted correct base model prediction data based on the second base model prediction data and the second error prediction data;

generating second confusion values data based on the second base model prediction data and the second predicted correct base model prediction data; and wherein generating the base model accuracy fairness metrics data comprises generating the base model accuracy fairness metrics data based on the second confusion values data.

8. The method of claim 7, wherein generating the first confusion values data comprises comparing the first base model prediction data to the first predicted correct base model prediction data.

9. The method of claim 8, wherein the machine learning base model has been trained on machine learning model training data comprising a plurality of features, and wherein running the machine learning error prediction model on the first input data to generate the first error prediction data comprises generating the first error prediction data based on the plurality of features.

10. The method of claim 9, wherein the first base model prediction data comprises confidence data, and wherein generating the first error prediction data comprises generating the first error prediction data based on the confidence data.

11. The method of claim 10, wherein the confidence data comprises first classification confidence data corresponding to a first prediction classification, wherein the confidence data comprises second classification confidence data corresponding to a second prediction classification, and wherein generating the first error prediction data comprises generating the first error prediction data based on a difference between the first classification confidence data and the second classification confidence data.

12. The method of claim 11, wherein generating the base model accuracy fairness metrics data comprises generating at least one metric selected from the group consisting of an average odds difference, an error rate difference, a false discovery rate difference, a false negative rate difference, a false omission rate difference, a false positive rate difference, and a true positive rate difference.

13. A system for generating machine learning model fairness accuracy metrics, the system comprising:

a memory having instructions therein; and at least one processor in communication with the memory, wherein the at least one processor is configured to execute the instructions to:

run a machine learning base model on first input data to generate first base model prediction data;

run a machine learning error prediction model on the first input data to generate first error prediction data;

generate first predicted correct base model prediction data based on the first base model prediction data and the first error prediction data;

generate first confusion values data based on the first base model prediction data and the first predicted correct base model prediction data; and generate base model accuracy fairness metrics data based on the first confusion values data.

14. The system of claim 13, wherein the at least one processor is further configured to execute the instructions to:

run the machine learning base model on second input data to generate second base model prediction data;

run the machine learning error prediction model on the second input data to generate second error prediction data;

generate second predicted correct base model prediction data based on the second base model prediction data and the second error prediction data;

generate second confusion values data based on the second base model prediction data and the second predicted correct base model prediction data; and generate the base model accuracy fairness metrics data based on the second confusion values data.

15. The system of claim 14, wherein the at least one processor is further configured to execute the instructions to compare the first base model prediction data to the first predicted correct base model prediction data to generate the first confusion values data.

16. The system of claim 15, wherein the machine learning base model has been trained on machine learning model training data comprising a plurality of features, and wherein the at least one processor is further configured to execute the instructions to generate the first error prediction data based on the plurality of features.

17. The system of claim 16, wherein the first base model prediction data comprises confidence data, and wherein the at least one processor is further configured to execute the instructions to generate the first error prediction data based on the confidence data.

18. The system of claim 17, wherein the confidence data comprises first classification confidence data corresponding to a first prediction classification, wherein the confidence data comprises second classification confidence data corresponding to a second prediction classification, and wherein the at least one processor is further configured to execute the instructions to generate the first error prediction data based on a difference between the first classification confidence data and the second classification confidence data.

19. The system of claim 18, wherein the at least one processor is further configured to execute the instructions to generate at least one metric selected from the group consisting of an average odds difference, an error rate difference, a false discovery rate difference, a false negative rate difference, a false omission rate difference, a false positive rate difference, and a true positive rate difference.

20. A non-transitory computer program product for generating machine learning model fairness accuracy metrics, the non-transitory computer program product comprising a computer readable storage medium having program instructions embodied therewith, the program instructions executable by at least one processor to cause the at least one processor to:

run a machine learning base model on first input data to generate first base model prediction data;

run a machine learning error prediction model on the first input data to generate first error prediction data;

generate first predicted correct base model prediction data based on the first base model prediction data and the first error prediction data;

generate first confusion values data based on the first base model prediction data and the first predicted correct base model prediction data; and generate base model accuracy fairness metrics data based on the first confusion values data.

21. The non-transitory computer program product of claim 20, wherein the program instructions are further executable by the at least one processor to cause the at least one processor to:

run the machine learning base model on second input data to generate second base model prediction data;

run the machine learning error prediction model on the second input data to generate second error prediction data;

generate second predicted correct base model prediction data based on the second base model prediction data and the second error prediction data;

generate second confusion values data based on the second base model prediction data and the second predicted correct base model prediction data; and generate the base model accuracy fairness metrics data based on the second confusion values data.

22. The non-transitory computer program product of claim 21, wherein the program instructions are further executable by the at least one processor to cause the at least one processor to compare the first base model prediction data to the first predicted correct base model prediction data to generate the first confusion values data.

23. The non-transitory computer program product of claim 22, wherein the machine learning base model has been trained on machine learning model training data comprising a plurality of features, and wherein the program instructions are further executable by the at least one processor to cause the at least one processor to generate the first error prediction data based on the plurality of features.

24. The non-transitory computer program product of claim 23, wherein the first base model prediction data comprises confidence data, and wherein the program instructions are further executable by the at least one processor to cause the at least one processor to generate the first error prediction data based on the confidence data.

25. The non-transitory computer program product of claim 24, wherein the confidence data comprises first classification confidence data corresponding to a first prediction classification, wherein the confidence data comprises second classification confidence data corresponding to a second prediction classification, and wherein the program instructions are further executable by the at least one processor to cause the at least one processor to generate the first error prediction data based on a difference between the first classification confidence data and the second classification confidence data.

* * * * *